United States Patent Office 3,125,438
Patented Mar. 17, 1964

3,125,438
METHOD AND COMPOSITION FOR MAKING CARBONATE-BONDED AGGLOMERATES
Richard L. Franklin, Glassport, James R. Guseman, Hempfield Township, Westmoreland County, and Eugene A. Pelczarski, West Deer Township, Allegheny County, Pa., assignors to United States Steel Corporation, a corporation of New Jersey
No Drawing. Filed Nov. 8, 1962, Ser. No. 236,406
4 Claims. (Cl. 75—3)

This invention relates to an improved method and composition for making carbonate-bonded agglomerates of iron ore or the like.

Conventionally carbonate-bonded ore agglomerates are made by mixing ore fines with an alkaline-earth metal oxide or hydroxide and a small amount of water, forming the mixture into green agglomerates (pellets or briquettes) of the desired size and shape, and treating the green agglomerates with $CO_2$ for a minimum period of about 30 minutes and usually longer. Thus the alkaline-earth metal compound is converted into a carbonate which bonds the ore particles. The resulting final agglomerates have sufficient mechanical strength for use in metallurgical processes.

An object of our invention is to provide an improved method of making carbonate-bonded ore agglomerates in which we not only shorten the duration of the $CO_2$ treatment, but also obtain stronger final agglomerates.

A further object is to provide an improved composition for forming into carbonate-bonded agglomerates, which composition produces stronger final agglomerates with shorter $CO_2$ treatment.

A more specific object is to provide an improved method and composition in which we attain the foregoing objects by replacing the conventional alkaline-earth metal oxide or hydroxide with calcium sulfide.

In practicing our invention, we first mix ore fines and calcium sulfide. The ore fines can be hematite, magnetite, or other oxidic or sulfide ores of iron or similar metals, such as manganese. The proportion of calcium sulfide is about 4 to 7 percent by weight on a dry basis or preferably about 5 to 7 percent. We moisten the mixture with water and form it into green agglomerates of any convenient size consist, preferably by a conventional pelletizing or molding operation. We require a moisture content in the green agglomerates of about 2 to 10 percent, or preferably about 3 to 7 percent. If necessary to attain this level, we predry the green agglomerates. Thus the green agglomerates have a composition by weight on a wet basis about as follows:

| | Percent |
|---|---|
| Ore fines | 85 to 96 |
| Calcium sulfide | 3.9 to 6.8 |
| Water | 2 to 10 |

Next we treat the green agglomerates with $CO_2$ in the conventional way, except that we can shorten the duration of this treatment to as little as about 15 minutes. The $CO_2$ can be dry or completely or partially moisture saturated. We prefer to conduct the $CO_2$ treatment at room temperature and atmospheric pressure. In this manner we convert the calcium sulfide to calcium carbonate, and thus form strong carbonate-bonded final agglomerates.

The following specific examples demonstrate the benefits we attain with our invention.

Example 1

We blended minus 8-mesh hematite ore fines with 6.4 percent by weight of powdered calcium sulfide and moistened the mixture sufficiently for pelletizing. We pelletized the mixture in a conventional pelletizing disc. The resulting green pellets were approximately 3/8 to 1/2 inch in diameter. We predried them to various moisture contents and treated them with water-saturated $CO_2$ for the times indicated at room temperature and atmospheric pressure. We tumbled the resulting carbonate-bonded pellets in a conventional coke tumbler for 50 revolutions and then screened the pellets on a U.S. Standard 30-mesh screen. The results were as follows:

| Percent moisture | Percent carbonation | Percentage of material retained on 30-mesh screen after tumbling |
|---|---|---|
| 1.3 | 40 | 63.7 |
| 1.6 | 50 | 78.0 |
| 2.0 | 52 | 81.6 |
| 3.0 | 64 | 90.5 |
| 4.0 | 74 | 92.6 |
| 5.5 | 80 | 95.8 |
| 6.0 | 81 | 97.8 |
| 10.0 | 73 | 78.9 |
| 13.5 | 54 | 50.0 |

We consider that 75 percent of the material should be retained on a 30-mesh screen for the product to be acceptable. These results show a sharp break occurs in the quantity of screen residue between 1.3 and 1.6 percent moisture at one extreme and between 10 and 13.5 percent at the other extreme. For those runs in which the screen residue was above 90 percent, practically all the residue was in the form of whole pellets. As these results also show, about 45 percent or higher carbonation is needed to obtain a satisfactory final product.

Example 2

We prepared green pellets similar to those described in Example 1, except we predried all of them to about 4.0 percent moisture. We carbonated them by the same procedure as in Example 1, but varied the duration of CO treatment. We also subjected the final pellets to the same tumbler test. The results were as follows:

| Time of carbonation, minutes | Percentage of material retained on 30-mesh screen after tumbling |
|---|---|
| 15 | 92.0 |
| 30 | 92.6 |
| 60 | 95.7 |

These results show we obtain strong pellets with $CO_2$ treatment of a duration as short as 15 minutes. Similar tests with agglomerates formed with CaO in place of CaS and carbonated for 30 to 60 minutes showed tumbler strengths of 64 to 72 percent retained on 30 mesh. We also find with CaS carbonation for longer than about 30 minutes adds little to the strength.

Example 3

We blended manganese sulfide and iron sulfide with about 5 percent calcium sulfide, moistened the mixture, and pelletized it in a conventional disc pelletizer. The resulting green pellets were about 1/2 inch in diameter and we predried them to moisture contents between 5 and 8 percent. We treated the green pellets with $CO_2$ at atmospheric pressure and room temperature. The final pellets were hard and had good mechanical strength.

From the foregoing description and examples it is seen that our invention affords a simple and effective method of making strong carbonate-bonded ore pellets with a $CO_2$ treatment of shortened duration. Although we prefer calcium sulfide as the compound to be mixed with ore, we use other alkaline-earth metal sulfides.

We claim:

1. A method of making carbonate-bonded ore agglomerates comprising mixing ore fines with about 3 to 7 percent by weight of an alkaline-earth metal sulfide, moistening the mixture, forming the moistened mixture into green agglomerates, adjusting the moisture content of the green agglomerates to a range of about 2 to 10 percent by weight, and treating the green agglomerates with $CO_2$ for a period of at least 15 minutes.

2. A method as defined in claim 1 in which the alkaline-earth metal sulfide is calcium sulfide.

3. A mixture for forming carbonate-bonded ore agglomerates, said mixture having a composition by weight on a wet basis about as follows:

| | Percent |
|---|---|
| Ore fines | 85 to 96 |
| Alkaline-earth metal sulfide | 3.9 to 6.8 |
| Water | 2 to 10 |

4. A mixture as defined in claim 3 in which the alkaline-earth metal sulfide is calcium sulfide.

References Cited in the file of this patent

UNITED STATES PATENTS

| 497,256 | Wanner | May 9, 1893 |
| 2,844,457 | Amberg | July 22, 1958 |